US012588047B2

(12) United States Patent
Guo et al.

(10) Patent No.: US 12,588,047 B2
(45) Date of Patent: Mar. 24, 2026

(54) METHOD AND APPARATUS FOR SENSING MEASUREMENT AND REPORT FOR SIDELINK

(71) Applicant: Lenovo (Beijing) Ltd., Beijing (CN)

(72) Inventors: Xin Guo, Beijing (CN); Xiaodong Yu, Beijing (CN)

(73) Assignee: Lenovo (Beijing) Ltd., Beijing (CN)

( * ) Notice: Subject to any disclaimer, the term of this patent is extended or adjusted under 35 U.S.C. 154(b) by 648 days.

(21) Appl. No.: 17/916,671

(22) PCT Filed: Apr. 3, 2020

(86) PCT No.: PCT/CN2020/083157
§ 371 (c)(1),
(2) Date: Oct. 3, 2022

(87) PCT Pub. No.: WO2021/196154
PCT Pub. Date: Oct. 7, 2021

(65) Prior Publication Data
US 2023/0171799 A1 Jun. 1, 2023

(51) Int. Cl.
*H04W 72/54* (2023.01)
*H04W 72/02* (2009.01)
(Continued)

(52) U.S. Cl.
CPC ........... *H04W 72/54* (2023.01); *H04W 72/02* (2013.01); *H04W 72/0446* (2013.01); *H04W 72/0453* (2013.01)

(58) Field of Classification Search
None
See application file for complete search history.

(56) References Cited

U.S. PATENT DOCUMENTS

| | | | | | |
|---|---|---|---|---|---|
| 2009/0196250 A1* | 8/2009 | Feng | ..................... | H04W 24/10 370/330 |
| 2016/0156393 A1* | 6/2016 | Chen | ....................... | H04B 7/04 370/329 |

(Continued)

FOREIGN PATENT DOCUMENTS

| | | |
|---|---|---|
| CN | 108616839 A | 10/2018 |
| CN | 108633074 A | 10/2018 |

(Continued)

OTHER PUBLICATIONS

Intel Corporation, Offline Summary for NR-V2X Agenda Item—7.2.4.1.4 Resource Allocation Mechanism, 2018, 3GPP TSG RAN WG1 Meeting #94, R1-1809867, pp. 1-5. (Year: 2018).*

(Continued)

*Primary Examiner* — Nicholas Sloms
(74) *Attorney, Agent, or Firm* — FIG. 1 Patents

(57) ABSTRACT

The present application is related to a method and apparatus for sensing measurement and report for 3GPP (3rd Generation Partnership Project) 5G new radio (NR) sidelink (SL). A method for wireless communications performed by user equipment (UE) includes: receiving sensing report configuration information, and the sensing report configuration information includes linkage information among a set of sidelink resources for the UE, a sensing result request resource, and a sensing result report resource; determining, based on the sensing report configuration information, whether to transmit a sensing result message; and in response to a determination of transmitting the sensing result message, transmitting the sensing result message.

20 Claims, 6 Drawing Sheets

(51) Int. Cl.
    *H04W 72/0446*     (2023.01)
    *H04W 72/0453*     (2023.01)

(56)         References Cited

U.S. PATENT DOCUMENTS

| | | | |
|---|---|---|---|
| 2016/0242152 A1 | 8/2016 | Yu et al. | |
| 2016/0295624 A1 | 10/2016 | Novlan et al. | |
| 2017/0026160 A1* | 1/2017 | Guo | H04W 72/04 |
| 2018/0279275 A1* | 9/2018 | Chen | H04W 72/23 |
| 2019/0132818 A1* | 5/2019 | Yasukawa | H04W 74/0816 |
| 2019/0132832 A1* | 5/2019 | Uchiyama | H04W 72/56 |
| 2019/0174286 A1* | 6/2019 | Guo | H04W 72/02 |
| 2019/0306835 A1* | 10/2019 | Hoang | H04W 72/53 |
| 2019/0394786 A1* | 12/2019 | Parron | H04W 4/46 |
| 2020/0037343 A1* | 1/2020 | He | H04W 72/20 |
| 2020/0107297 A1* | 4/2020 | Wang | H04W 72/0446 |
| 2020/0178217 A1* | 6/2020 | Huang | H04W 76/27 |
| 2021/0219268 A1* | 7/2021 | Li | H04B 17/318 |
| 2023/0199728 A1* | 6/2023 | Yoshioka | H04W 76/14 |
| | | | 370/329 |

FOREIGN PATENT DOCUMENTS

| | | |
|---|---|---|
| CN | 110351858 A | 10/2019 |
| CN | 110447294 A | 11/2019 |
| CN | 110603869 A | 12/2019 |
| WO | 2019028900 A1 | 2/2019 |
| WO | 2019036578 A1 | 2/2019 |
| WO | 2019064228 A2 | 4/2019 |
| WO | 2019066706 A1 | 4/2019 |

OTHER PUBLICATIONS

Apple, Resource Allocation for Mode 2, 2019, 3GPP TSG RAN WG1 Meeting #99, R1-1912812, pp. 1-9. (Year: 2019).*

20928726.7 , "Extended European Search Report", EP Application No. 20928726.7, Dec. 13, 2023, 9 pages.

CATT , "UE Sensing Result Report", 3GPP TSG RAN WG2 Meeting #95, R2-164759, Gothenburg, Sweden [retrieved Nov. 2, 2022]. Retrieved from the Internet <https://www.3gpp.org/ftp/tsg_ran/wg2_rl2/TSGR2_95/Docs/>., Aug. 2016, 2 Pages.

PCT/CN2020/083157 , "International Preliminary Report on Patentability", PCT Application No. PCT/CN2020/083157, Oct. 13, 2022, 6 pages.

PCT/CN2020/083157 , "International Search Report and Written Opinion", PCT Application No. PCT/CN2020/083157, Dec. 31, 2020, 7 pages.

"Foreign Office Action", CN Application No. 202080099215.7, Jan. 2, 2025, 58 pages.

Huawei, "Summary of [102#74][LTE/V2X]—Sensing and reporting for Mode 3", 3GPP TSG-RAN WG2 Meeting #103, R2-1811255, Gothenburg, Sweden, Aug. 20, 2018, 22 pages.

* cited by examiner

ON
Sensing | OFF | ON
Sensing | OFF | ON
Sensing | OFF

Partial Sensing Cycle | Partial Sensing Cycle | Partial Sensing Cycle

ON Sensing Duration of
Partial Sensing Cycle

| Index(i) | Report Quantity | | | | | Request Message | | Report Message | |
|---|---|---|---|---|---|---|---|---|---|
| | Traffic Type | Traffic Priority | Transmission Type | Sensing Window# | Candidate Resource# | Request Type | Request Resource | Report Type | Report Resource |
| #0 | Traffic Type | Traffic Priority | Transmission Type | Sensing Window#$j_0$ | Candidate Resource#$k_0$ | Request Type | Request Resource | Report Type | Report Resource |
| #1 | Traffic Type | Traffic Priority | Transmission Type | Sensing Window#$j_1$ | Candidate Resource#$k_1$ | Request Type | Request Resource | Report Type | Report Resource |
| #2 | Traffic Type | Traffic Priority | Transmission Type | Sensing Window#$j_2$ | Candidate Resource#$k_2$ | Request Type | Request Resource | Report Type | Report Resource |
| ⋮ | | | | | | | | | |
| #N−1 | Traffic Type | Traffic Priority | Transmission Type | Sensing Window#$j_{N-1}$ | Candidate Resource#$k_{N-1}$ | Request Type | Request Resource | Report Type | Report Resource |
| Default | Traffic Type | Traffic Priority | Transmission Type | Sensing Window#j | Candidate Resource#k associated with Sensing Window | Request Type | Request Resource | Report Type | Report Resource |

METHOD AND APPARATUS FOR SENSING MEASUREMENT AND REPORT FOR SIDELINK

TECHNICAL FIELD

Embodiments of the present application generally relate to wireless communication technology, especially to a method and an apparatus for sensing measurement and report for 3GPP (3rd Generation Partnership Project) 5G new radio (NR) sidelink (SL).

BACKGROUND

Vehicle to everything (V2X) has been introduced into 5G wireless communication technology. In terms of a channel structure of V2X communication, a direct link between two user equipments (UEs) is called a sidelink (SL). Sidelink is a long-term evolution (LTE) feature introduced in 3GPP Release 12, and enables a direct communication between UEs in proximity, and data does not need to go through a base station (BS) or a core network.

5G and/or NR networks are expected to increase network throughput, coverage, and robustness and reduce latency and power consumption. With the development of 5G and NR networks, various aspects need to be studied and developed to perfect the 5G/NR technology.

SUMMARY

Some embodiments of the present application provide a method for wireless communications performed by user equipment (UE). The method includes: receiving sensing report configuration information, and the sensing report configuration information includes linkage information among a set of sidelink resources for the UE, a sensing result request resource, and a sensing result report resource; determining, based on the sensing report configuration information, whether to transmit a sensing result message; and in response to a determination of transmitting the sensing result message, transmitting the sensing result message.

Some embodiments of the present application also provide an apparatus for wireless communications. The apparatus includes: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the above-mentioned method performed by UE.

Some embodiments of the present application provide a method for wireless communications. The method may be performed by UE or a network (e.g., a BS). The method includes: receiving a sensing report configuration request; determining sensing report configuration information, and the sensing report configuration information includes linkage information among a set of sidelink resources for UE, a sensing result request resource, and a sensing result report resource; and transmitting the sensing report configuration information.

Some embodiments of the present application provide an apparatus for wireless communications. The apparatus includes: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the above-mentioned method performed by UE or a network (e.g., a BS).

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

FIG. 8 illustrates exemplary sensing report configuration information in accordance with some embodiments of the present application.

DETAILED DESCRIPTION

The detailed description of the appended drawings is intended as a description of preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3GPP 5G, 3GPP LTE Release 8 and so on. It is contemplated that along with developments of network architectures and new service scenarios, all embodiments in the present application are also applicable to similar technical problems; and moreover, the terminologies recited in the present application may change, which should not affect the principle of the present application.

Figures 1, 2:
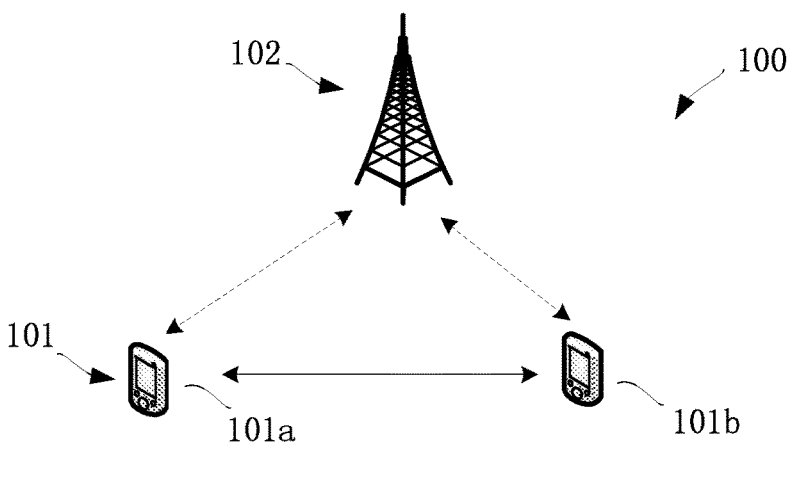
FIG. 1 illustrates a schematic diagram of a wireless communication system in accordance with some embodiments of the present application.
FIG. 2 illustrates an exemplary distribution of a partial sensing window in the time domain in accordance with some embodiments of the present application.

FIG. 1 illustrates a schematic diagram of a wireless communication system in accordance with some embodiments of the present application.

As shown in FIG. 1, a wireless communication system 100 includes at least one user equipment (UE) 101 and at least one base station (BS) 102. In particular, the wireless communication system 100 includes two UEs 101 (e.g., UE 101a and UE 101b) and one BS 102 for illustrative purpose. Although a specific number of UEs 101 and BS 102 are depicted in FIG. 1, it is contemplated that any number of UEs 101 and BS s 102 may be included in the wireless communication system 100.

The UE(s) 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to some embodiments of the present application, the UE(s) 101 may include a portable wireless communication device, a smart phone, a cellular telephone, a flip phone, a device having a subscriber identity module, a personal computer, a selective call receiver, or any other device that is capable of sending and receiving communication signals on a wireless network.

In some embodiments of the present application, UE is pedestrian UE (P-UE or PUE) or cyclist UE. In some embodiments of the present application, the UE(s) 101 includes wearable devices, such as smart watches, fitness bands, optical head-mounted displays, or the like. Moreover, the UE(s) 101 may be referred to as a subscriber unit, a mobile, a mobile station, a user, a terminal, a mobile terminal, a wireless terminal, a fixed terminal, a subscriber station, a user terminal, or a device, or described using other terminology used in the art. The UE(s) 101 may communicate directly with BSs 102 via LTE or NR Uu interface.

In some embodiments of the present application, each of the UE(s) 101 may be deployed an IoT application, an eMBB application and/or a URLLC application. For instance, UE 101a may implement an IoT application and may be named as an IoT UE, while UE 101b may implement an eMBB application and/or a URLLC application and may be named as an eMBB UE, an URLLC UE, or an eMBB/URLLC UE. It is contemplated that the specific type of application(s) deployed in the UE(s) 101 may be varied and not limited.

According to some embodiments of FIG. 1, UE 101a functions as Tx UE, and UE 101b functions as Rx UE. UE 101a may exchange V2X messages with UE 101b through a sidelink, for example, PC5 interface as defined in 3GPP TS 23.303. UE 101a may transmit information or data to other UE(s) within the V2X communication system, through sidelink unicast, sidelink groupcast, or sidelink broadcast. For instance, UE 101a transmits data to UE 101b in a sidelink unicast session. UE 101a may transmit data to UE 101b and other UEs in a groupcast group (not shown in FIG. 1) by a sidelink groupcast transmission session. Also, UE 101a may transmit data to UE 101b and other UEs (not shown in FIG. 1) by a sidelink broadcast transmission session.

Alternatively, according to some other embodiments of FIG. 1, UE 101b functions as Tx UE and transmits V2X messages, UE 101a functions as Rx UE and receives the V2X messages from UE 101b.

According to some embodiments of FIG. 1, UEs 101 may be grouped into one more groups, and each group includes a leader UE and one or more member UEs. For example, UE 101a functions as a member UE and UE 101b functions as a leader UE. In a further example, UE 101a functions as a leader UE and UE 101b functions as a member UE.

Both UE 101a and UE 101b in the embodiments of FIG. 1 may transmit information to BS 102 and receive control information from BS 102, for example, via LTE or NR Uu interface. The BS(s) 102 may be distributed over a geographic region. In certain embodiments of the present application, each of the BS(s) 102 may also be referred to as an access point, an access terminal, a base, a base unit, a macro cell, a Node-B, an evolved Node B (eNB), a gNB, a Home Node-B, a relay node, or a device, or described using other terminology used in the art. The BS(s) 102 is generally a part of a radio access network that may include one or more controllers communicably coupled to one or more corresponding BS(s) 102.

The wireless communication system 100 may be compatible with any type of network that is capable of sending and receiving wireless communication signals. For example, the wireless communication system 100 is compatible with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, an LTE network, a 3GPP-based network, a 3GPP 5G network, a satellite communications network, a high altitude platform network, and/or other communications networks.

In some embodiments of the present application, the wireless communication system 100 is compatible with the 5G NR of the 3GPP protocol, wherein BS(s) 102 transmit data using an OFDM modulation scheme on the downlink (DL) and the UE(s) 101 transmit data on the uplink (UL) using a Discrete Fourier Transform-Spread-Orthogonal Frequency Division Multiplexing (DFT-S-OFDM) or cyclic prefix-OFDM (CP-OFDM) scheme. More generally, however, the wireless communication system 100 may implement some other open or proprietary communication protocols, for example, WiMAX, among other protocols.

In some embodiments of the present application, the BS(s) 102 may communicate using other communication protocols, such as the IEEE 802.11 family of wireless communication protocols. Further, in some embodiments of the present application, the BS(s) 102 may communicate over licensed spectrums, whereas in other embodiments, the BS(s) 102 may communicate over unlicensed spectrums. The present application is not intended to be limited to the implementation of any particular wireless communication system architecture or protocol. In yet some embodiments of the present application, the BS(s) 102 may communicate with the UE(s) 101 using the 3GPP 5G protocols.

In 3GPP standard document TS36.300 [2], the design related to partial sensing for UE (e.g., PUE) is as follows. Resource pool for transmission of UE (e.g., PUE) may be overlapped with resources for V2X sidelink communication. For each transmission pool, a resource selection mechanism (i.e., a random selection procedure, or a partial sensing based selection mechanism), which is allowed to be used in this transmission pool, is also configured. A partial sensing based selection mechanism may also be named as a partial sensing based resource selection mechanism, a partial sensing mechanism, a partial sensing procedure, or the like. If UE (e.g., PUE) is configured to use either a random selection mechanism or a partial sensing based selection mechanism for one transmission pool, it is up to implementations of the UE to select a specific resource selection mechanism.

If UE (e.g., PUE) is configured to use a partial sensing based selection mechanism only, the UE shall use the partial sensing based selection mechanism in the pool. The UE shall not do a random selection mechanism in the pool, since only a partial sensing operation is allowed. If a BS does not provide a random selection pool, the UE that supports only a random selection mechanism cannot perform sidelink transmission. In exceptional pool, the UE uses a random selection mechanism.

According to 3GPP standard document TS36.213 [4], if UE (e.g., PUE) is configured to use a partial sensing based selection mechanism, the UE will monitor the resource only in a subset of subframes. Compared with a random selection mechanism, a partial sensing based selection mechanism can reduce resource collision probability. Compared with a full sensing based selection mechanism, a partial sensing based selection mechanism can achieve power saving to a certain extent.

When UE (e.g., UE 101*a* or UE 101*b* illustrated and shown in FIG. 1) performs a partial sensing based selection mechanism or a partial sensing based reselection mechanism, the UE should have sensed on a sensing window with all allowed resource reservation periodicities configured by a higher layer before using sensing result(s) for resource reselection mechanism. The UE may not know when the resource selection or reselection procedure will be performed, and thus, a sensing window for the UE should be periodical. Without loss of generality, if the first time unit (such as, a subframe in time and frequency domains) of a partial sensing window is as a start point of a partial sensing cycle, distributions of the partial sensing window in time domain can be shown in FIG. 2.

FIG. 2 illustrates an exemplary distribution of a partial sensing window in the time domain in accordance with some embodiments of the present application.

As can be seen, in the embodiments of FIG. 2, there are three partial sensing cycles in a partial sensing window, and each partial sensing cycle (e.g., Partial Sensing Cycle as shown in FIG. 2) includes ON Sensing duration (e.g., ON Sensing as shown in FIG. 2) and OFF duration (e.g., OFF as shown in FIG. 2). It can be contemplated that in some other embodiments of the present application, there may be more or less multiple partial sensing cycles in a partial sensing window.

ON Sensing duration of a partial sensing cycle may also be named as On Sensing Duration for Partial Sensing, Sensing Active Time of a partial sensing cycle, Sensing Active Time for Partial Sensing, or the like. OFF duration of a partial sensing cycle may also be named as Off Sensing Duration for Partial Sensing, Sensing Inactive Time of a partial sensing cycle, Sensing Inactive Time for Partial Sensing, or the like.

Currently, sensing or partial sensing based resource selection was originally introduced in 3GPP Release 14 V2X for vehicle UE (VUE) and pedestrian UE (PUE) operating in Mode 2, respectively. In this case, one UE in Mode 2 can only determine resource selection based on its own sensing results. In 3GPP Release 16, UE(s) can be grouped together, facilitating internal information exchange among UEs and a road side unit (RSU).

For example, "Vehicle Platooning" enables vehicles to dynamically form a group travelling together, allows the grouped vehicles to be automatically driven via exchanging internal information. "Extended Sensors" enables an exchange of raw or processed data gathered through local sensors or live video data among vehicles, RSUs, devices of pedestrians and V2X application servers. In that case, the vehicles can enhance the perception of their environment beyond what their own sensors can detect and have a more holistic view of the local situation. In "Advanced Driving," each vehicle and/or RSU shares data obtained from its local sensors with vehicles in proximity, and thus it thus allows vehicles to coordinate their trajectories or maneuvers. In addition, each vehicle shares its driving intention with vehicles in proximity.

Then, an issue of how to exploit a cooperative feature among multiple UE(s) to facilitate sensing and partial sensing based resource allocation while guaranteeing power saving needs to be addressed for sidelink communication in Mode 2. However, details regarding how to solve this issue have not been defined.

Some embodiments of the present application provide a sensing measurement and report mechanism, to enable UE to efficiently utilize sensing results measured by other UE without constructing connection between them. Some embodiments of the present application provide a method for requesting sensing report configuration information. Some embodiments of the present application provide a method for transmitting sensing report configuration information. Some embodiments of the present application provide an apparatus for requesting sensing report configuration information. Some embodiments of the present application provide an apparatus for transmitting sensing report configuration information.

Figure 3:
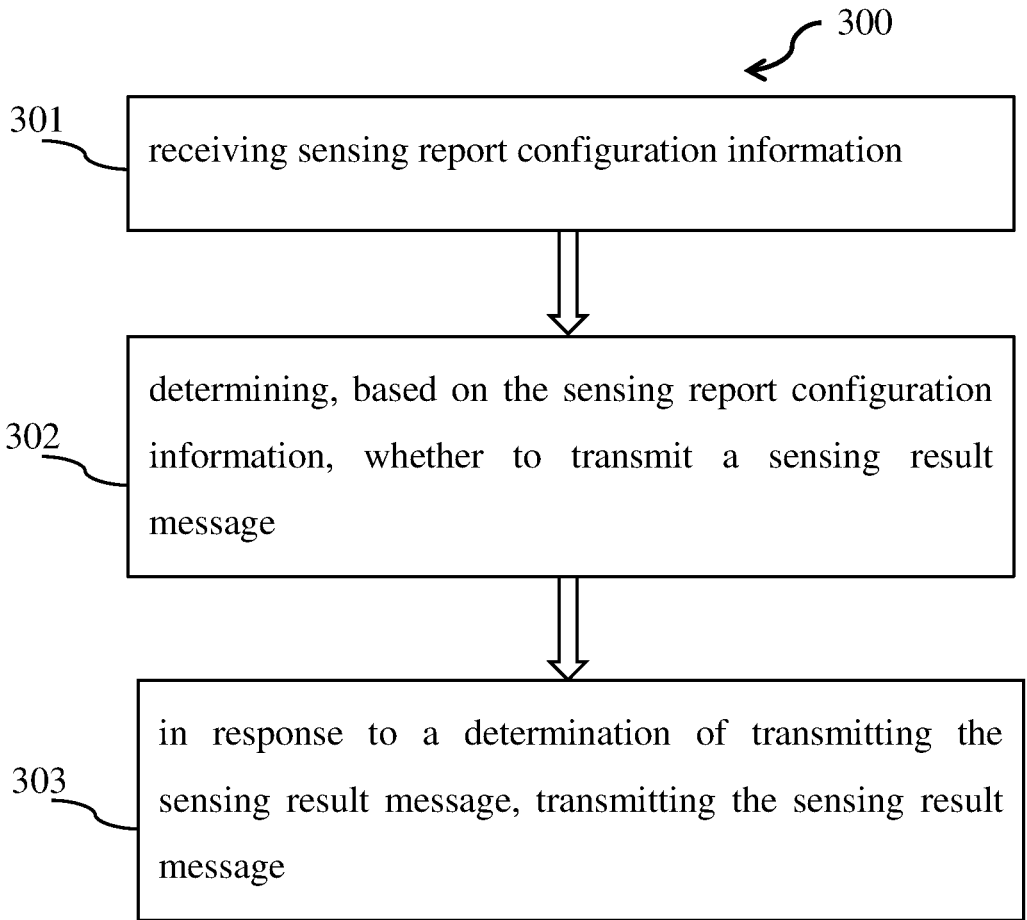
FIG. 3 illustrates a flow chart of a method for wireless communications in accordance with some embodiments of the present application.

FIG. 3 illustrates a flow chart of a method for wireless communications in accordance with some embodiments of the present application. The embodiments of FIG. 3 may be performed by UE (e.g., UE 101*a* or UE 101*b* illustrated and shown in FIG. 1). The UE may be PUE or VUE. The UE may function as member UE. A sensing result request and report function may be enabled or disabled for the UE.

In the exemplary method 300 as shown in FIG. 3, in operation 301, UE receives sensing report configuration information. In some embodiments, the UE transmits a sensing report configuration request, and then receives the sensing report configuration information.

In some embodiments, the UE receives a pedestrian-to-everything (P2X) resource selection configuration information of a selected resource pool, and the P2X resource selection configuration information includes the sensing report configuration information. P2X resource selection configuration information may be denoted by resourceSelectionConfigP2X.

In some other embodiments, the UE receives a vehicle-to-everything (V2X) resource selection configuration information of a selected resource pool, and the V2X resource selection configuration information includes the sensing report configuration information. V2X resource selection configuration information may be denoted by resourceSelectionConfigV2X.

The sensing report configuration information may include linkage information among a set of sidelink resources for the UE, a sensing result request resource, and a sensing result report resource. The linkage information may include at least one of:

(1) a time and frequency offset between the set of sidelink resources for the UE and the sensing result request resource;

(2) a time and frequency offset between the set of sidelink resources for the UE and the sensing result report resource; and (3) a time and frequency offset between the sensing result request resource and the sensing result report resource.

The sensing report configuration information indicates configuration(s) of sensing result request and report, and may be denoted by Sesnsing-ReportConfig. Sesnsing-ReportConfig may be configured by radio resource control (RRC) signaling, a MAC control element (CE), sidelink control information (SCI) signaling, or downlink control information (DCI) signaling. The set of sidelink resources for the UE indicates a sensing window and may be denoted by Sensing Window. The sensing result request resource may be denoted by RequestResource. The sensing result report resource may be denoted by ReportResource.

In some embodiments of the present application, Sesnsing-ReportConfig explicitly or implicitly includes an identity of the UE. The identity of the UE may be denoted by ueID. The ueID can be associated with each sensing window and indicated in Sesnsing-ReportConfig. The ueID may be a full size UE identity. The ueID may be just an index within a group of identifiers.

In one example, the ueID can be indicated explicitly in Sesnsing-ReportConfig. In a further example, the ueID can be indicated implicitly in Sesnsing-ReportConfig. For instance, a set of Sensing Window for a group of UEs will be indicated according to the ordered sequence of ueID.

In some embodiments of the present application, Sesnsing-ReportConfig may include at least one of: a set of sidelink resources for the UE, a sensing result request resource, a sensing result report resource, a candidate resource range of the UE, a traffic type, a traffic priority, and a transmission type. The set of sidelink resources for the UE may be denoted by Sensing Window. The sensing result request resource may be denoted by RequestResource. The sensing result report resource may be denoted by ReportResource. The candidate resource range of the UE may be denoted by CandidateResource. The value of CandidateResource can be represented by resource in the time domain and/or in the frequency domain.

The traffic type may be denoted by TrafficType. For example, the traffic type may be one of: a periodic traffic type, an aperiodic traffic type, a pedestrian to everything (P2X) traffic type, and a vehicle to everything (V2X) traffic type.

The traffic priority may be denoted by TrafficPriority. For example, the traffic priority may be one of: a ProSe Per-Packet Priority (PPPP) defined in long term evolution (LTE) sidelink and a priority defined in PC5 5G QoS Identifier (PQI).

The transmission type may be denoted by Transmission-Type. For example, the transmission type may be one of: an initial transmission type and a retransmission type.

Sesnsing-ReportConfig may include one or more sensing report configuration items, and the sensing result message corresponds to a subset of the one or more sensing report configuration items. Exemplary details of these items are described in WO 2021/196154 PCT/CN2020/083157 the embodiments of FIG. 8.

An operation of sensing or measurement may be carried out on the set of sidelink resources, i.e., Sensing Window, in order to derive the quantity or quantities of resources to be reported. A Sensing Window can be represented by resource in the time domain and/or in the frequency domain. For example, a Sensing Window can be represented in a resource pool by:

(1) a set of indices of subframes;
(2) indices of boundary subframes;
(3) an index of a starting subframe of the Sensing Window and a size (i.e., a total number of subframes) of the Sensing Window; or
(4) a subframe offset from previous Sensing Window and a size (i.e., a total number of subframes) of the Sensing Window.

In some embodiments of the present application, Sensing Window is configured for periodic, semi-persistent, or aperiodic.

Periodic Sensing Window occurs every periodSW subframes. The value of the periodicity of periodSW may be configured in Sensing-ReportConfig.

For semi-persistent Sensing Window, a certain periodicity may be configured. The operation of sensing result request and report can be activated or deactivated based on MAC control elements (MAC CE).

For aperiodic Sensing Window, no periodicity is configured. UE is explicitly triggered about each operation of sensing result request and report, such as by means of sidelink control information (SCI) signaling.

For different sensing report configuration items within Sensing-ReportConfig, the pattern (i.e., contiguous or non-contiguous) of the Sensing Window or a size (i.e., a total number of subframes) of the SensingWindow can be identical or non-identical.

In operation 302 of the exemplary method 300, the UE determines, based on the received sensing report configuration information, whether to transmit a sensing result message.

In operation 303 of the exemplary method 300, in response to determination of transmitting the sensing result message, the UE transmits the sensing result message.

Figure 4:
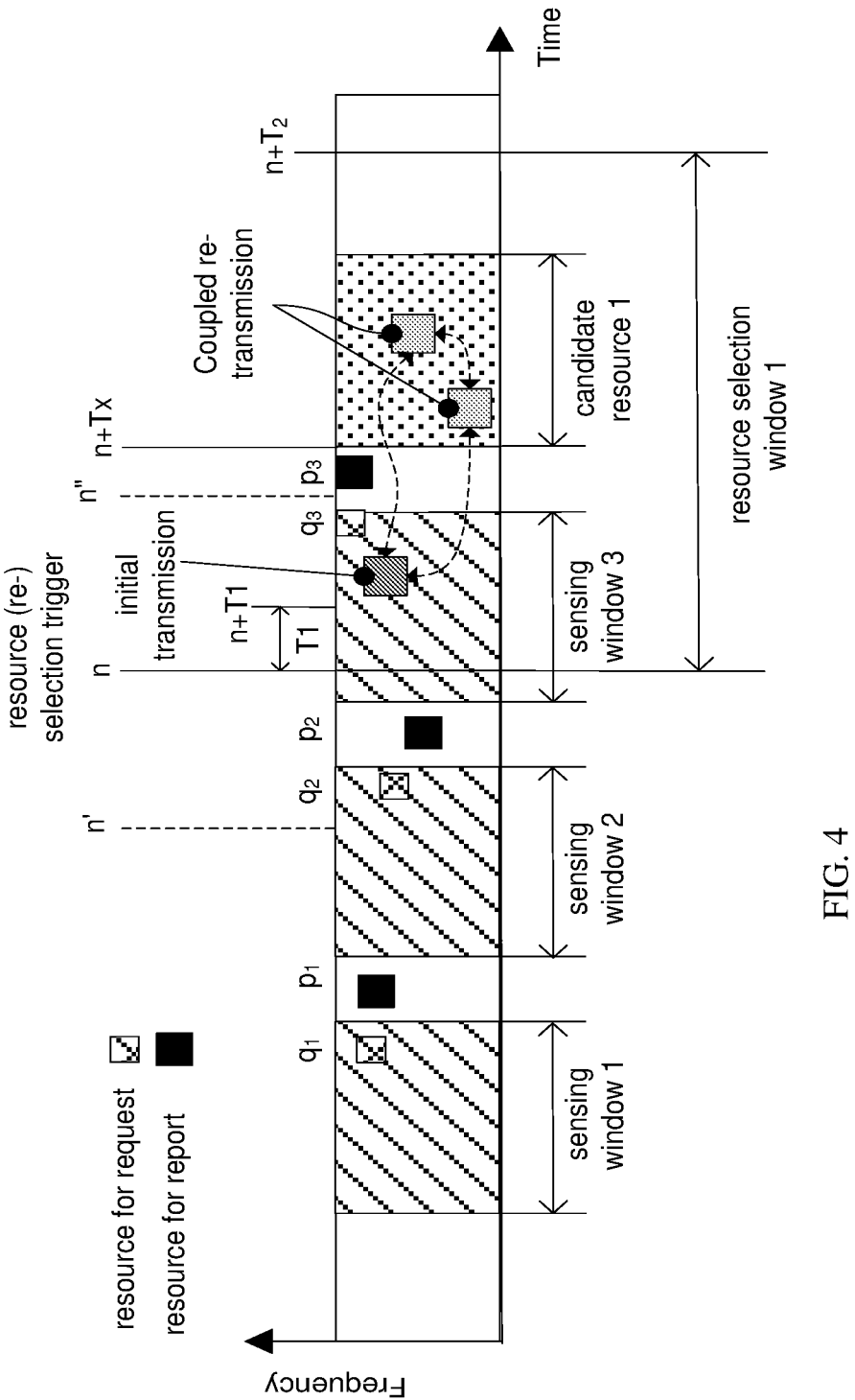
FIG. 4 illustrates an exemplary partial sensing based selection mechanism in accordance with some embodiments of the present application.

In some embodiments of the present application, the sensing result message in operation 303 is a sensing result request. The UE may transmit the sensing result request on the sensing result request resource. The sensing result request resource may be determined based on the sensing report configuration information received in operation 301 of the exemplary method 300. In an embodiment, the UE determines whether to transmit a sensing result request further based on:

(1) resource selection triggering time or resource re-selection triggering time of the UE (for example, a time instance "n" as shown in the embodiments of FIG. 4);
(2) whether the sensing result request resource is available; and
(3) a candidate resource range of the UE (i.e., CandidateResource).

In some other embodiments of the present application, the sensing result message in operation 303 is a sensing result report. For example, the sensing result report could include a reserved resource(s) in a given resource range CandidateResource, and the reserved resource(s) is reserved by a certain traffic defined by TrafficType, TrafficPriority or Transmission Type and detected within the Sensing Window of the UE. In an alternative example, the sensing result report could include a recommend resource(s) in a given resource range CandidateResource, and the recommend resource(s) is determined based on sensing results detected within the Sensing Window of the UE.

If above two examples of report contents within a sensing result report are both supported in some embodiments, different contents can be indicated by "Report Type" defined in the field "Report Message", as shown in FIG. 8. For instance, "Report Type" may indicate that a sensing result report is used to report the reserved resource(s), or a sensing result report is used to report the recommend resource(s).

In an embodiment, the UE firstly receives a sensing result request on the sensing result request resource, and then, in response to the received sensing result request indicating that the UE satisfies a report condition, the UE transmits the sensing result report on the sensing result report resource.

In a further embodiment, the UE firstly determines whether energy detected on the sensing result request is above a pre-defined threshold; and then, in response to the energy being above the pre-defined threshold, the UE transmits the sensing result report on the sensing result report resource.

Details described in all the foregoing embodiments of the present application (for example, specific operations of sensing result report of UE and the related parameters) are applicable for all the embodiments as shown in FIGS. 4-8.

FIG. 4 illustrates an exemplary partial sensing based selection mechanism in accordance with some embodiments of the present application.

FIG. 4 show three partial sensing windows for three UEs, i.e., sensing window 1, sensing window 2, and sensing window 3. Although sensing window 1, sensing window 2, and sensing window 3 are not overlapped as shown in FIG. 4, these partial sensing windows may overlap in the time domain and/or in the frequency domain in some other embodiments of the present application.

According to the embodiments of FIG. 4, three UEs are configured with a partial sensing based resource selection mechanism, and correspond to the three partial sensing windows, respectively. For example, three UEs are UE1, UE2, and UE3, respectively, and each of them may be UE 101a or UE 101b illustrated and shown in FIG. 1, or another UE not shown in FIG. 1. UE1 senses on "sensing window 1" with all allowed resource reservation periodicities configured by a higher layer, UE2 senses on "sensing window 2" with all allowed resource reservation periodicities configured by a higher layer, and UE3 senses on "sensing window 3" with all allowed resource reservation periodicities configured by a higher layer. It can be contemplated that there may be different corresponding relationships between the UEs and the partial sensing windows, and it does not limit the principles of the present application.

The sensing results obtained in "sensing window 1" may be used for determining one or more candidate resources for a PSCCH transmission and/or a PSSCH transmission in a resource selection window. After that, at a time instance "n", the resource selection (or reselection) may be triggered. As shown in FIG. 4, resource (re-)selection trigger is the time instance "n". Then, for a PSCCH transmission and/or a PSSCH transmission based on the sensing results determined from "sensing window 1", UE1 may determine one or more candidate resources in "resource selection window 1" between the time instance "n" and a time instance "n+T2". T2 is a time period larger than 0. For instance, the range of value and determination method for T2 may be determined as specified in 3GPP standard document.

Although the resource (re-)selection may be triggered at the time instance "n", UE1 may not determine the one or more candidate resources at the time instance "n", because there may be a processing delay of UE1. A processing delay T1 of UE1 may be larger than or equal to 0. For example, the range of value and determination method for T1 may be determined as specified in 3GPP standard document.

As shown in FIG. 4, in "resource selection window 1" of UE1, another UE (for example, a VUE) may transmit an aperiodic transmission. The aperiodic transmission may include an initial transmission (for example, "initial transmission" as shown in FIG. 4) that is coupled with two re-transmissions (for example, "coupled re-transmission" as shown in FIG. 4). As can be seen from FIG. 4, the initial transmission is within "sensing window 3" of UE3 and two coupled re-transmissions are within "resource selection window 1" of UE1. The initial transmission and two coupled re-transmissions may be transmitted by UE2 or transmitted by UE different from UE1, UE2, and UE3. Since the transmission pattern of the aperiodic transmission (i.e., the initial transmission and two coupled re-transmissions) is not predictable, it may not be sensed by the UE 1. Therefore, it is very likely for the aperiodic transmission to collide with candidate resource determined based on partial sensing mechanism for P2X related sidelink communication.

In some embodiments of the present application, a resource for UE to transmit a sensing result report may be defined as "a resource for report" or "a report resource", which may be denoted by ReportResource. With reference to FIG. 4, black blocks, denoted by $p_i$, illustrate available sidelink (PSCCH, or PSSCH) resources of ReportResource. The sensing result report of the UE can be denoted by Sensing-ResultReport. There is a linkage between the Sensing Window and ReportResource. The report resource can be configured or scheduled following its corresponding Sensing Window. The linkage can be done by describing the ReportResource with time and frequency offset from a certain reference resource block of the corresponding Sensing Window.

In some embodiments of the present application, a resource for UE to transmit a request for sensing result report may be defined as "a resource for request" or "a request resource", which may be denoted by RequestResource. The request for sensing result report can be also named as "a sensing result request" and can be denoted by Sensing-ResultRequest. There is also a linkage between the Sensing Window and RequestResource. The linkage can be done by describing the RequestResource with time and frequency offset from a certain reference resource block of the corresponding Sensing Window. With reference to FIG. 4, meshed blocks, denoted by $q_i$, illustrate available sidelink (PSCCH, or PSSCH) resources of RequestResource. Preferably, RequestResource is within the range of Sensing Window. In that case, the UE will not perform extra sensing and detection of Sensing-ResultRequest.

The time and frequency offset for the RequestResource or the ReportResource can be fixed. For example, the RequestResource or the ReportResource is pre-configured such as in a resource pool. The time and frequency offset for the RequestResource or the ReportResource can be dynamic. For example, the RequestResource or the ReportResource is scheduled by UE or a network (e.g., a BS). Specific time and frequency locations of the RequestResource and the ReportResource in different sensing windows may be different.

In particular, the embodiments of FIG. 4 show three resources for request (i.e., $q_1$, $q_2$, and $q_3$) and three resources for report (i.e., $p_1$, $p_2$, and $p_3$) associated with "sensing window 1", "sensing window 2", and "sensing window 3," respectively. The "sensing window 1" may be denoted by SensingWindow #1. The "sensing window 2" may be denoted by SensingWindow #2. The "sensing window 3" may be denoted by SensingWindow #3. The "resource selection window 1" in the embodiments of FIG. 4 includes candidate resource 1 as shown in FIG. 4, which may be denoted by CandidateResource #1.

In the embodiments of FIG. 4, UE1 which is configured with SensingWindow #1 will report sensing results in its SensingWindow #1 on resource $p_1$ according to configuration when a report condition(s) is satisfied, UE2 which is configured with SensingWindow #2 will report its quantity on resource $p_2$ when a report condition(s) is satisfied, and UE3 which is configured with SensingWindow #3 will report its quantity on resource $p_3$ when a report condition(s) is satisfied. Reporting operations of UE1, UE2, and UE3 can be periodic, semi-persistent, or aperiodic, and follow configurations of their corresponding SensingWindow.

In the embodiments of FIG. 4, if there is a processing delay of UE1 "T1" as shown in FIG. 4, which is larger than 0, and a starting time of CandidateResource #1 is time instant "n+Tx" as shown in FIG. 4, UE1 may determine whether there is available RequestResouce and ReportResource between a time interval of [n+T1, n+Tx]. In response to there being available RequestResouce and ReportResource between the time interval of [n+T1, n+Tx], the UE1 may determine to send a sensing result request.

In the embodiments that an operation of sensing result request and report is pre-configured in a resource pool, UE's procedures in higher layer and the UE's procedures in physical layer are described as below. In these embodiments, the Sensing-ReportConfig can be indicated by a network via configurable parameters or can be pre-configured in a resource pool.

Regarding UE's Procedures in Higher Layer

Specifically, if UE is configured to transmit P2X related V2X sidelink communication, if the UE determines lower layers to transmit the P2X related V2X sidelink communication based on a partial sensing procedure using the selected resource pool, and if Sensing-ReportConfig is included in P2X resource selection configuration information (i.e., resourceSelectionConfigP2X) of the selected resource pool, the UE shall configure lower layers to transmit the sidelink control information and the corresponding data based on the partial sensing procedure using the selected resource pool coupled with sensing result request and report function.

If UE is configured to transmit V2X sidelink communication, if the UE determines lower layers to transmit the V2X sidelink communication based on a sensing procedure using the selected resource pool, and if Sensing-ReportConfig is included in V2X resource selection configuration information (i.e., resourceSelectionConfigV2X) of the pool selected, the UE shall configure lower layers to transmit the sidelink control information and the corresponding data using the selected resource pool coupled with sensing result request and report function.

Figure 5:
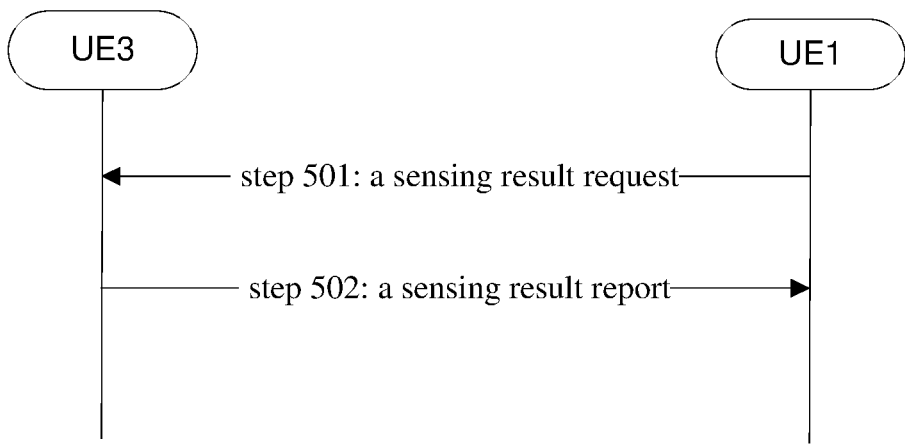
FIG. 5 illustrates an exemplary flow chart for sensing result request and report in accordance with some embodiments of the present application.

Regarding UE's procedures in physical layer, if Sensing-ReportConfig is configured by higher layers for the UE, the steps in the embodiments of FIG. 5 are used when identifying candidate resource(s) within the resource selection window. Taking partial sensing based resource selection specified in 3GPP Release 14 V2X for pedestrian UE (PUE) operating in Mode 2 as an example, legacy identifying candidate resource(s) within the resource selection window comprises the following steps:

(1) UE (e.g., UE1 in FIG. 4) shall determine by its implementation a set of subframes (which may be denoted by original candidate resource set S) within the interval [n+T1, n+T2]. For example, "candidate resource 1" as shown in FIG. 4 is S.

(2) The UE excludes, from S, resource(s) reserved in S based on sensing results detected in a partial sensing window of the UE (e.g., sensing window 1 in FIG. 4).

(3) The UE further determines candidate resource(s) from the remaining resource(s) in S based on energy detection results on the resources within S.

In the present application, UE (e.g., UE1 in FIG. 4) can take a sensing result report obtained from other UE (e.g., UE3) into the operation of identifying candidate resource(s). In particular, UE can utilize a sensing result report in operations of: (1) determining a set of subframes as original candidate resource set S; and/or (2) excluding, from S, the resource reserved in S; and/or (3) further determining remaining candidate resource(s) in S based on sensing results detected both in a partial sensing window of the UE and indicated in the sensing result report. For example, if a sensing result report obtained by UE1 from other UE3 includes a reserved resource(s) (e.g., two coupled re-transmissions reserved in "candidate resource 1" by an aperiodic transmission as shown in FIG. 4.), then, the reserved resource(s) can be removed from S by UE1, in order to avoid a resource collision between the transmission of UE1 and the detected aperiodic transmission. Wherein, the reservation information of these two coupled re-transmissions are detected in the initial transmission of the aperiodic transmission within "sensing window 3" as shown in FIG. 4. In an alternative example, if a sensing result report obtained by UE1 from other UE3 includes a recommend resource(s), then, UE1 can take the recommend resource(s) into consideration in the operation of further determining candidate resource(s) in the remaining resource(s) in S.

FIG. 5 illustrates an exemplary flow chart for sensing result request and report in accordance with some embodiments of the present application. The embodiments of FIG. 5 are pertinent to the embodiments of FIG. 4, and UE1 and UE3 in FIG. 5 respectively represent UE1 and UE3 and perform corresponding functions and operations of UE1 and UE3 described above for the embodiments of FIG. 4. It can be contemplated that UE1 and UE3 in FIG. 5 may refer to other UEs that perform similar functions and operations, and specific names of UE1 and UE3 may vary in different embodiments, for example, UEx and UEy.

In the embodiments of FIG. 4, if resource (re-)selection triggers at "n", UE1 may determine a sensing result request (i.e., Sensing-ResultRequest) at $q_3$; if resource (re-)selection triggers at "n'", UE1 may determine Sensing-ResultRequest at $q_2$ and $q_3$, respectively; and if resource (re-)selection triggers at "n''", UE1 may determine not to send Sensing-ResultRequest, because no RequestResource is available.

Similar to FIG. 4, the embodiments of FIG. 5 assume that UE1 selects CandidateResource #1 and is associated with SensingWindow #1, and UE3 is associated with Sensing Window #3. When resource (re-)selection triggers at "n", UE1 determines whether to send a sensing result request (i.e., Sensing-ResultRequest) based on the time instant "n", available RequestResouce, available ReportResource and its CandidateResource (i.e., CandidateResource #1).

For example, UE1 determines whether there is available RequestResouce and associated ReportResource between the time instant "n" and CandidateResource #1. In response to there is available RequestResouce and associated ReportResource between the time instant "n" and CandidateResource #1, the UE may determine to send a sensing result request.

In step 501 of FIG. 5, if UE1 determines to send a sensing result request (i.e., Sensing-ResultRequest), UE1 will send the Sensing-ResultRequest on the corresponding RequestResource. UE1 will send the Sensing-ResultRequest via broadcast or groupcast over sidelink communication.

In the embodiments of FIG. 5, if the RequestResource is contained in Sensing Window #3 of UE3, UE3 will detect the Sensing-ResultRequest during its sensing operation. If UE3 satisfies a reporting condition, then, UE3 determines whether to send a Sensing-ResultReport on the corresponding ReportResource according to the indication of the Sensing-ResultRequest. In step 502 of FIG. 5, if UE3 determines to send a sensing result report (i.e., Sensing-ResultReport), UE3 will send Sensing-ResultReport on the corresponding ReportResource. UE3 will send Sensing-ResultReport via broadcast or groupcast over sidelink communication.

For instance, if the energy detected on the Sensing-ResultRequest is above a predefined threshold, UE3 determines to send a Sensing-ResultReport on the corresponding ReportResource according to the indication of the Sensing-ResultRequest.

In some embodiments of the present application, for another UE that is different from UE1 or UE3, if this UE senses and detects that Sensing-ResultRequest is not set, this UE may use the corresponding ReportResource for transmission if needed. Otherwise, if this UE senses and detects that Sensing-ResultRequest has been set, this UE will avoid using the corresponding ReportResource for transmission.

Figure 6:
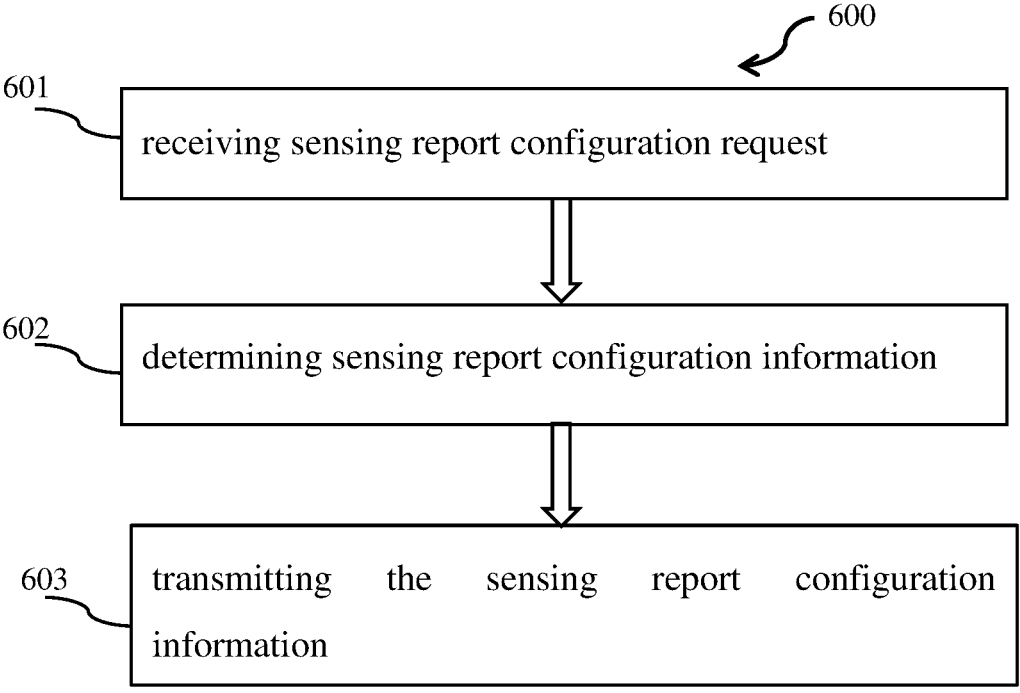
FIG. 6 illustrates a further flow chart of a method for wireless communications in accordance with some embodiments of the present application.

FIG. 6 illustrates a further flow chart of a method for wireless communications in accordance with some embodiments of the present application. The embodiments of FIG. 6 may be performed by a leader UE (e.g., UE 101a or UE 101b illustrated and shown in FIG. 1).

In the embodiments of FIG. 6, in step 601, UE or a network (e.g., a BS) receives a sensing report configuration request. In step 602, the UE or the network determines sensing report configuration information (i.e., Sesnsing-ReportConfig). The Sesnsing-ReportConfig includes linkage information among Sensing Window, RequestResource, and ReportResource. In step 603, the UE or the network transmits the sensing report configuration information.

Details described in the embodiments as illustrated and shown in FIG. 1-5, especially, contents related to a sensing result request and report procedure, are applicable for the embodiments as illustrated and shown in FIG. 6. Moreover, details described in the embodiments of FIG. 6 are applicable for all the embodiments of FIGS. 1-5 and 7-9.

In the embodiments that an operation of sensing result request and report is scheduled by UE or a network (e.g., a BS), the UE's procedures for configuring are described as below. In the embodiments that a network determines Sensing-ReportConfig for UE, the network may transmit the Sensing-ReportConfig to the UE by RRC signaling, MAC CE, or DCI signaling. Specific examples are described in FIG. 7.

Figure 7:
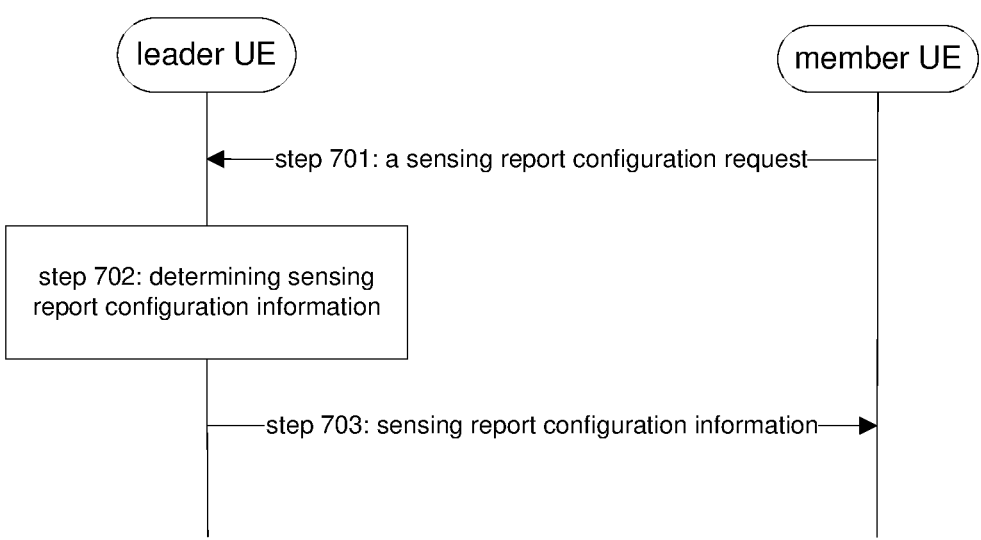
FIG. 7 illustrates a further exemplary flow chart for sensing result request and report in accordance with some embodiments of the present application.

FIG. 7 illustrates a further exemplary flow chart for sensing result request and report in accordance with some embodiments of the present application. In the embodiments of FIG. 7, a member UE may be UE1 illustrated in FIGS. 4 and 5, and a leader UE may be UE2 or UE3 illustrated in FIGS. 4 and 5 or another UE in different embodiments (for example, UEx). Similarly, in the embodiments of FIG. 7, a member UE may be UE 101a or UE 101b illustrated and shown in FIG. 1, and a leader UE may be UE 101b or UE 101a illustrated and shown in FIG. 1.

In step 701, a member UE sends a sensing report configuration request to a leader UE. The sensing report configuration request may be named as a request for sensing report configuration or the like. The request indicates that the member UE supports relative functions of sensing result request and report.

In step 702, a sensing result request and report function is enabled by higher layer signaling. When being enabled, the leader UE will determine Sensing-ReportConfig for the member UE, in response to the received sensing report configuration request.

In step 703, the leader UE sends sensing report configuration information to the member UE, to indicate the Sensing-ReportConfig to the member UE. The indication can be conveyed by RRC signaling, MAC CE, or SCI signaling.

FIG. 8 illustrates exemplary sensing report configuration information in accordance with some embodiments of the present application. An exemplary Sensing-ReportConfig is illustrated by FIG. 8. It can be contemplated that Sensing-ReportConfig in the present application may include more or less other elements or items than those in FIG. 8, and may include different elements or items from those in FIG. 8.

In the embodiments of FIG. 8, each configuration contains one or more configuration item(s), indicated by an index in column 1 of FIG. 8. Each configuration item in Sensing-ReportConfig contains three fields of "Report Quantity", "Request Message", and "Report Message". In particular:

Report Quantity further contains Traffic Type, Traffic Priority, Transmission Type, Sensing Window configuration, and Candidate Resource configuration. The Sensing Window configuration refers to a set of sidelink resources in time and frequency domains for UE and may be denoted by Sensing Window. The Candidate Resource configuration refers to a candidate resource range of UE and may be denoted by CandidateResource.

Request Message further contains Request Type and/or Request Resource. The Request type can include such as one bit, X-bit, or a BIT STRING.

Report Message further contains Report Type and/or Report Resource. The Report Type can be periodic, semi-persistent, or aperiodic. Alternatively, the Report Type can indicate the sensing result report include a reserved resources(s) or a recommend resource(s).

In some embodiments of the present application, Sensing-ResultRequest can be formatted as follows:

(1) Sensing-ResultRequest has only one bit. If Sensing-ResultRequest is set to 1, and if the Sensing-ResultRequest is transmitted on RequestResource associated with Sensing Window #j (e.g., in step 701 in the embodiments of FIG. 7), then, the results sensed in the Sensing Window #j based on a default configuration item (i.e., the last row "Default" in the embodiments of FIG. 8) should be reported (e.g., in step 703 in the embodiments of FIG. 7). The default configuration item may indicate a sensing result report indicating resource(s) that is reserved by a certain traffic defined by TrafficType TrafficPriority, or Transmission Type, in a given resource range CandidateResource #k and detected within the Sensing Window #j.

(2) Sensing-ResultRequest is an X-bit field indicating an index into a Sesnsing-ReportConfig table as shown in FIG. 8. If Sensing-ResultRequest is set, such as #i, within its value domain, and if the Sensing-ResultRequest is transmitted on RequestResource associated with Sensing Window #$j_i$ (e.g., in step 701 in the embodiments of FIG. 7), then, the results sensed in the SensingWindow #j, based on a configuration item #i should be reported (e.g., in step 703 in the embodiments of FIG. 7). The configuration item may indicate a sensing result report indicating resource(s) that is reserved by a certain traffic defined by TrafficType TrafficPriority, or TransmissionType, in a given resource range CandidateResource #$k_i$ and detected within the Sensing Window #$j_i$.

For instance, if i=2, the results sensed in the Sensing Window #$j_2$ based on a configuration item indicated by an index "#2" in the fourth row of the embodiments of FIG. 8 should be reported.

(3) Sensing-ResultRequest is a BIT STRING with a size (i.e., a total number of configuration items) of the Sesnsing-ReportConfig. If the i-th bit of the Sensing- ResultRequest is set to 1, and if the Sensing-ResultRequest is transmitted on RequestResource associated with Sensing Window #$j_i$, the results sensed in the Sensing Window #$j_i$ based on a configuration item #i should be reported. In each BIT STRING, one or more bits can be set as 1 simultaneously. The configuration item may indicate a sensing result report indicating resource(s) that is reserved by a certain traffic defined by TrafficType TrafficPriority, or TransmissionType, in a given resource range CandidateResource #$k_i$ and detected within the Sensing Window #$j_i$.

Details described in the embodiments as illustrated and shown in FIG. 1-7, especially, contents related to a sensing result request and report procedure, are applicable for the embodiments as illustrated and shown in FIG. 8. Moreover, details described in the embodiments of FIG. 8 are applicable for all the embodiments of FIGS. 1-7 and 9.

Figure 9:
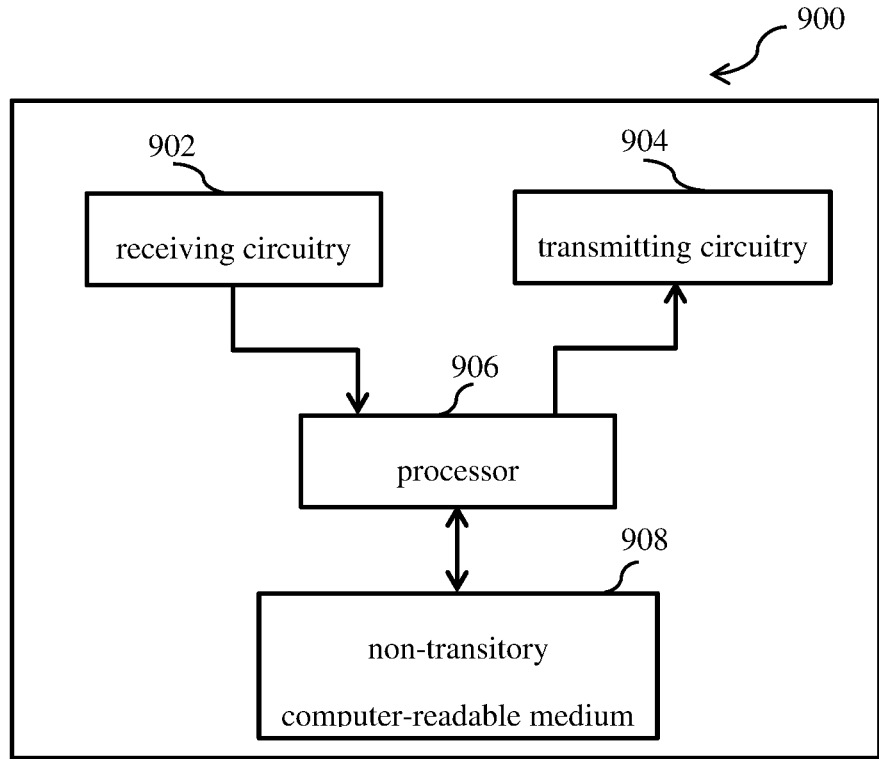
FIG. 9 illustrates a block diagram of an exemplary apparatus in accordance with some embodiments of the present application.

FIG. 9 illustrates a block diagram of an exemplary apparatus in accordance with some embodiments of the present application. Referring to FIG. 9, the apparatus 900 includes a receiving circuitry 902, a transmitting circuitry 904, a processor 906, and a non-transitory computer-readable medium 908. The processor 906 is coupled to the non-transitory computer-readable medium 908, the receiving circuitry 902, and the transmitting circuitry 904.

It is contemplated that some components are omitted in FIG. 9 for simplicity. In some embodiments, the receiving circuitry 902 and the transmitting circuitry 904 may be integrated into a single component (e.g., a transceiver).

In some embodiments, the non-transitory computer-readable medium 908 may have stored thereon computer-executable instructions to cause a processor to implement the operations with respect to UE(s) as described above. For example, upon execution of the computer-executable instructions stored in the non-transitory computer-readable medium 908, the processor 906, the receiving circuitry 902 and the transmitting circuitry 904 perform the method of FIG. 3, including: the receiving circuitry 902 receives sensing report configuration information, and the sensing report configuration information includes linkage information among a set of sidelink resources for the UE, a sensing result request resource, and a sensing result report resource; the processor 906 determines, based on the sensing report configuration information, whether to transmit a sensing result message; and in response to a determination of transmitting the sensing result message, the transmitting circuitry 904 transmits the sensing result message.

In some embodiments, the non-transitory computer-readable medium 908 may have stored thereon computer-executable instructions to cause a processor to implement the operations with respect to BS(s) as described above. For example, upon execution of the computer-executable instructions stored in the non-transitory computer-readable medium 908, the processor 906, the receiving circuitry 902 and the transmitting circuitry 904 perform the method of FIG. 6, including: the receiving circuitry 902 receives a sensing report configuration request; the processor 906 determines sensing report configuration information, and the sensing report configuration information includes linkage information among a set of sidelink resources for UE, a sensing result request resource, and a sensing result report resource; and the transmitting circuitry 904 transmits the sensing report configuration information.

The method of the present application can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which there resides a finite state machine capable of implementing the flowcharts shown in the figures may be used to implement the processor functions of the present application.

Those having ordinary skills in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed is:

1. A user equipment (UE) for wireless communication, comprising:

at least one memory; and at least one processor coupled with the at least one memory and configured to cause the UE to:

receive sensing report configuration information, a sensing result request resource, and a sensing result report resource;

determine, based on the sensing report configuration information, whether to transmit a sensing result message;

receive a sensing result request;

determine whether energy detected on the sensing result request is above a pre-defined threshold; and transmit, in response to a determination to transmit the sensing result message and the energy being above the pre-defined threshold, the sensing result message on the sensing result report resource, wherein the sensing result message comprises a sensing result report.

2. The UE of claim 1, wherein the sensing result message comprises a second sensing result request, and the at least one processor is configured to cause the UE to:

transmit the second sensing result request on the sensing result request resource.

3. The UE of claim 2, wherein the at least one processor is configured to cause the UE to determine whether to transmit the second sensing result request based on one or more of:

at least one of resource selection triggering time or resource re-selection triggering time of the UE;

whether the sensing result request resource is available; or a candidate resource range of the UE.

4. The UE of claim 1, wherein the sensing result request is received on the sensing result request resource, and wherein the at least one processor is configured to cause the UE to:

transmit, in response to the received sensing result request indicating that the UE satisfies a report condition, the sensing result report on the sensing result report resource.

5. The UE of claim 1, wherein the sensing report configuration information explicitly or implicitly includes an identity of the UE.

6. The UE of claim 1, wherein the sensing report configuration information includes at least one of: a set of sidelink resources for the UE, the sensing result request resource, the sensing result report resource, a candidate resource range of the UE, a traffic type, a traffic priority, or a transmission type.

7. The UE of claim 1, wherein the sensing report configuration information includes one or more sensing report configuration items, and the sensing result message corresponds to a subset of the one or more sensing report configuration items.

8. The UE of claim 1, wherein the sensing report configuration information is configured by at least one of:

radio resource control (RRC) signaling;

a MAC control element (CE);

sidelink control information (SCI) signaling; or downlink control information (DCI) signaling.

9. The UE of claim 1, wherein a sensing result request and report function is enabled or disabled for the UE.

10. An apparatus, comprising:

at least one memory; and at least one processor coupled with the at least one memory and operable to cause the apparatus to:

receive a sensing report configuration request;

determine sensing report configuration information, a sensing result request resource, and a sensing result report resource;

transmit the sensing report configuration information;

transmit a sensing result request; and receive, based on the sensing report configuration information and an energy associated with the sensing result request being above a pre-defined threshold, a sensing result message on the sensing result report resource, wherein the sensing result message is a sensing result report.

11. The apparatus of claim 10, wherein the sensing report configuration information includes at least one of: a set of sidelink resources for a user equipment (UE), the sensing result request resource, the sensing result report resource, a candidate resource range of the UE, a traffic type, a traffic priority, or a transmission type.

12. The apparatus of claim 10, wherein the at least one processor is further configured to cause the apparatus to transmit the sensing report configuration information using one or more of:

radio resource control (RRC) signaling;

a MAC control element (CE);

sidelink control information (SCI) signaling; or downlink control information (DCI) signaling.

13. The apparatus of claim 10, wherein the sensing report configuration information includes linkage information for a set of sidelink resources for a user equipment (UE), wherein the linkage information includes at least one of:

a time and frequency offset between the set of sidelink resources for the UE and the sensing result request resource;

a time and frequency offset between the set of sidelink resources for the UE and the sensing result report resource; or a time and frequency offset between the sensing result request resource and the sensing result report resource.

14. The apparatus of claim 10, wherein a set of sidelink resources for a user equipment (UE) is configured for one or more of periodic, semi-persistent, or aperiodic.

15. The apparatus of claim 10, wherein the at least one processor is further configured to cause the apparatus to configure a sensing result request and report function as one or more of enabled or disabled for a user equipment (UE).

16. The UE of claim 4, wherein the sensing result message comprises a report type field comprising a report type indicating at least one of one or more reserved resources or one or more recommend resources.

17. A method performed by a user equipment (UE), the method comprising:

receiving sensing report configuration information, a sensing result request resource, and a sensing result report resource;

determining, based on the sensing report configuration information, whether to transmit a sensing result message;

receiving a sensing result request;

determine whether energy detected on the sensing result request is above a pre-defined threshold; and transmitting, in response to determining to transmit the sensing result message and the energy being above the pre-defined threshold, the sensing result message on the sensing result report resource, wherein the sensing result message is a sensing result report.

18. The method of claim 17, wherein the sensing result message comprises a second sensing result request, and the method further comprises transmitting the second sensing result request on the sensing result request resource.

19. A method performed by an apparatus, the method comprising:

receiving a sensing report configuration request;

determining sensing report configuration information, a sensing result request resource, and a sensing result report resource;

transmitting the sensing report configuration information;

transmitting a sensing result request; and receiving, based on the sensing report configuration information and an energy associated with the sensing result request being above a pre-defined threshold, a sensing result message on the sensing result report resource, wherein the sensing result message is a sensing result report.

US 12,588,047 B2

19

20

20. The method of claim 18, wherein determining whether to transmit the second sensing result request is based on one or more of:

at least one of resource selection triggering time or resource re-selection triggering time of the UE;

whether the sensing result request resource is available; or a candidate resource range of the UE.

* * * * *